Jan. 7, 1930.　　　　E. KOSKI　　　1,743,040
SIGNALING DEVICE
Filed June 9, 1928　　　2 Sheets-Sheet 1
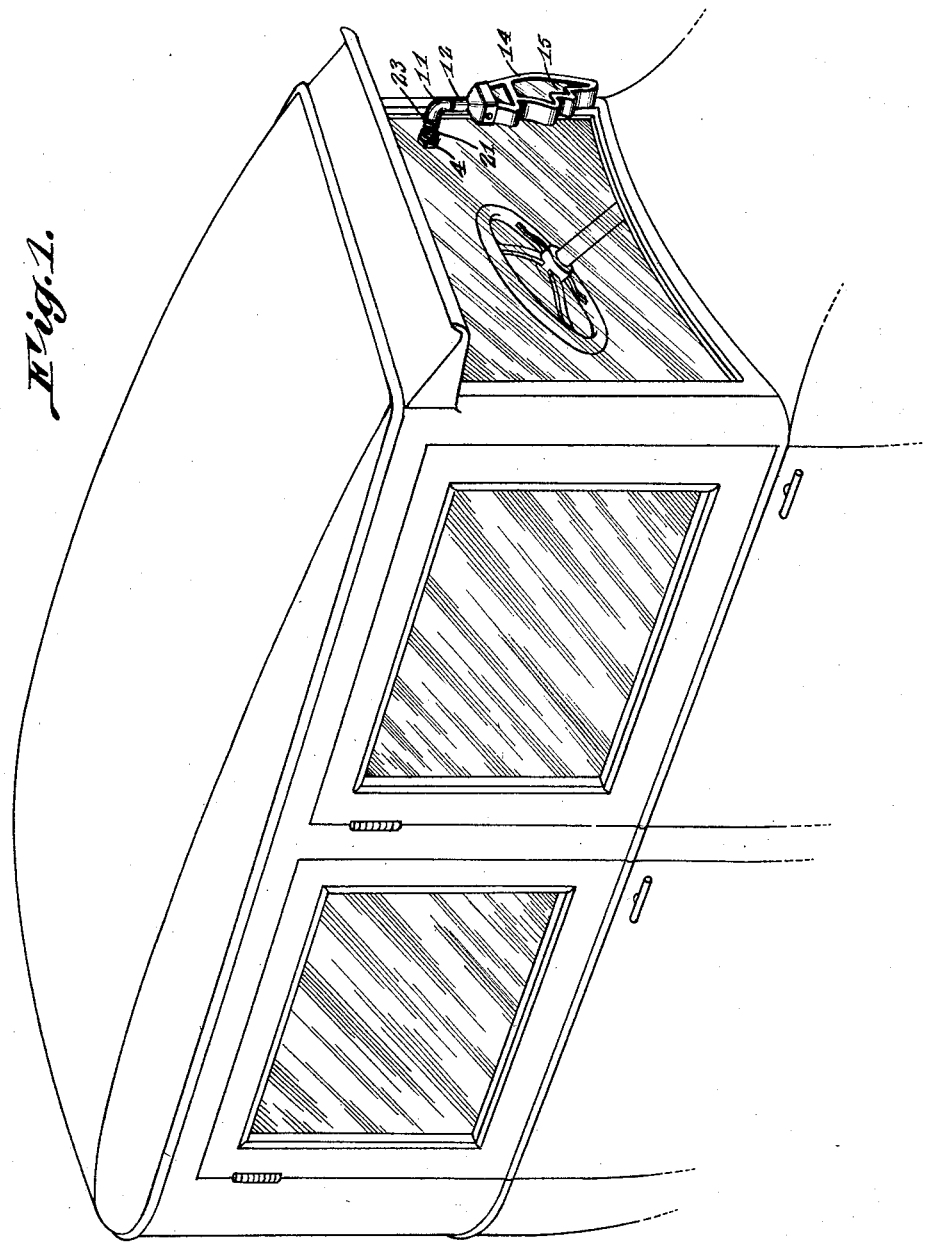
Emil Koski, Inventor
By Victor J. Evans
Attorney Jan. 7, 1930.                    E. KOSKI                       1,743,040
                              SIGNALING DEVICE
                            Filed June 9, 1928           2 Sheets-Sheet 2
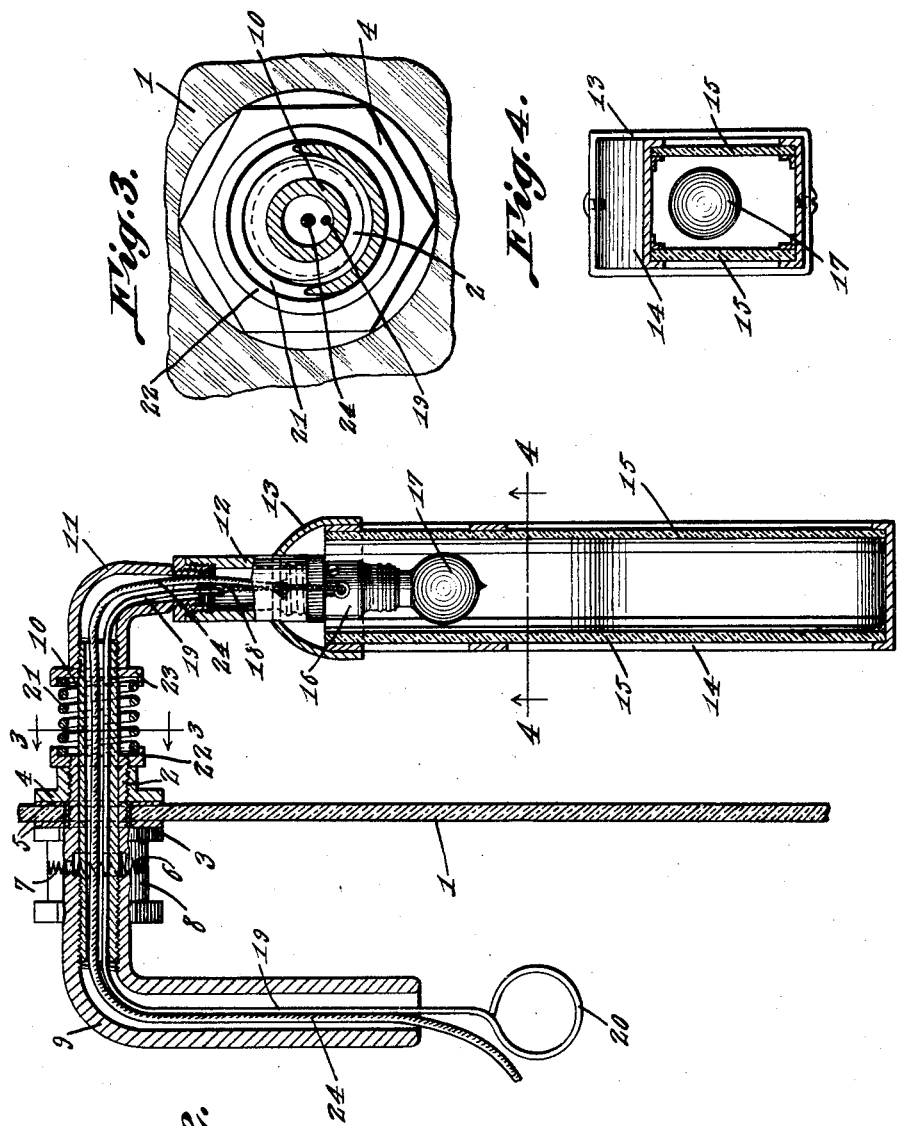
Emil Koski, Inventor
By Victor J. Evans
                              Attorney Patented Jan. 7, 1930

1,743,040

UNITED STATES PATENT OFFICE

EMIL KOSKI, OF ABERDEEN, WASHINGTON

SIGNALING DEVICE

Application filed June 9, 1928. Serial No. 284,142.

This invention relates to a directional signal for motor vehicles, the general object of the invention being to provide a signal of simple construction and which can be easily operated from the driver's seat and one which is arranged on the windshield so that it can be seen both from the rear and in front and which can also be seen by the driver himself so that he can readily set the signal in the desired position.

A further object of the invention is to provide latch means whereby the signal can be locked in position by releasing the handle thereof and released by an outward pull on the handle and then set by turning the handle while holding it in its outward position, with spring means for automatically locking the parts in set position when the handle is released.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the invention installed on a sedan type of automobile.

Figure 2 is a vertical sectional view through the windshield and through the signal.

Figure 3 is a section on line 3—3 of Figure 2.

Figure 4 is a section on line 4—4 of Figure 2.

As shown in the drawings, I form a hole in the transparent member 1 of the windshield and pass a threaded bushing 2 therethrough, the bushing having a flange 3 thereon which abuts against the inner face of the transparent member and a nut 4 is threaded on the outer end of the bushing and has its flange abutting the outer face of the transparent member. Gaskets 5 are placed between the flanges and the transparent member, as shown. Thus the bushing is held in the opening in the transparent member.

The inner end of the bushing is enlarged and provided with teeth 6 which are engaged by teeth 7 on an enlarged part 8 of an L-shaped handle 9, the horizontal arm of which is internally threaded to receive the threaded inner end of a tubular member 10 which passes through the bushing and is rotatably supported therein. An elbow-shaped member 11 is threaded to the outer end of the member 10, this elbow-shaped member being also of tubular construction and the stem 12 of a cap 13 is threaded to the outer end of the member 11. This cap fits over the upper end of a lamp casing 14 and is suitably fastened thereto so that it may be detached, this casing being made somewhat in the form of a hand with the index finger extended, and the front and rear faces of said casing are formed of transparent material 15.

A socket 16 is carried by the cap and a lamp bulb 17 engages the socket and extends within the casing. A flexible member 18 is connected with the switch of the socket and a wire 19 is connected with the flexible member and said wire extends through the members 9, 10 and 11 and projects from the free end of the member 9, this end of the wire being formed with a loop 20 so that it can be easily grasped by one hand and pulled to open and close the switch. A spring 21 surrounds the outer part of the member 10 and bears against a flange 22 which serves as a lock nut for the nut 4 and against a flanged part 23 on the member 10, this spring acting to hold the teeth 7 of the part 8 in engagement with the teeth 6 of the member 2 so that the handle, the part 10 and the casing are held against movement.

By pulling the handle inwardly, however, the teeth are disengaged so that by moving the handle, the member 10 is rocked in the bushing and thus the casing can be swung outwardly or inwardly, as desired. Then by releasing the handle, the spring will cause the teeth to engage each other and thus lock the parts in adjusted position. Thus I have provided simple means whereby the driver can easily and quickly set the signal to a horizontal position to indicate that a left turn is to be made or a position where it will extend upwardly and outwardly from the side of the car to indicate that a right hand turn is to be made. When the casing is in the position shown in Figure 1, it cannot be seen from the rear and thus the device is in inoperative position. The driver can turn on the light when driving at night by simply pulling upon the wire 19. The conductors 24 for the lamp pass through the tubular parts, as shown in Figure 2.

It is thought from the foregoing description that the advantages and novel features of my invention will be readily apparent.

It is to be understood that I may make changes in the construction and in the combination and arrangement of the several parts, provided that such changes fall within the scope of the appended claim.

What I claim is:—

A signal for a motor vehicle comprising a bushing passing through a hole in the windshield, said bushing having an enlarged inner end with teeth thereon, a nut on the outer end of the bushing for holding the same in the hole, a tubular member passing through the bushing and rotatably arranged therein, a tubular handle of L-shape connected with the inner end of the tubular member and having an enlargement on its horizontal arm provided with teeth for engaging the teeth on the bushing, a tubular elbow connected with the outer end of the tubular member, a cap connected with the elbow, a lamp casing detachably connected with the cap, and a spring encircling the outer part of the tubular member and bearing against a part of the elbow for holding the teeth in engagement.

In testimony whereof I affix my signature.

EMIL KOSKI.